US006754859B2

(12) United States Patent
Hayden et al.

(10) Patent No.: US 6,754,859 B2
(45) Date of Patent: Jun. 22, 2004

(54) COMPUTER PROCESSOR READ/ALTER/ REWRITE OPTIMIZATION CACHE INVALIDATE SIGNALS

(75) Inventors: Bruce E. Hayden, Glendale, AZ (US); William A. Shelly, Phoenix, AZ (US)

(73) Assignee: Bull HN Information Systems Inc., Billerica, MA (US)

( * ) Notice: Subject to any disclaimer, the term of this patent is extended or adjusted under 35 U.S.C. 154(b) by 423 days.

(21) Appl. No.: 09/752,924

(22) Filed: Jan. 3, 2001

(65) Prior Publication Data

US 2002/0087925 A1 Jul. 4, 2002

(51) Int. Cl.[7] .............................. G11C 29/00; G11C 7/00
(52) U.S. Cl. ....................... 714/721; 714/722; 714/719; 714/723; 365/205
(58) Field of Search ................................ 714/718–723; 365/200, 201

(56) References Cited

U.S. PATENT DOCUMENTS

| | | | | |
|---|---|---|---|---|
| 5,265,232 A | * | 11/1993 | Gannon et al. | ............. 711/124 |
| 5,463,736 A | * | 10/1995 | Elko et al. | .................... 710/28 |
| 5,517,626 A | * | 5/1996 | Archer et al. | ................ 710/110 |
| 5,519,839 A | * | 5/1996 | Culley et al. | ................. 710/52 |
| 5,524,208 A | * | 6/1996 | Finch et al. | .................... 714/25 |
| 5,996,061 A | * | 11/1999 | Lopez-Aguado et al. | ... 712/207 |

OTHER PUBLICATIONS

Seong Tae Jhang; Chu Shik Jhon; A new write snooping cache coherence protocol for split transaction bus–based multiprocessor systems, Proceedings IEEE Region 10 Conference on Computer, Communication, Control and Power Engineering, Issue: 0, 19–2.*

Dahlgren, F.; Boosting the performance of hybrid snooping cache protocols, Proceedings 22nd Annual International Symposiu on Computer Architecture, Jun. 22–24, 1995, Page(s): 60–69.*

Terasawa, T.; Ogura, S.; Inoue, K.; Amano, H.; A cache coherency protocol for multiprocessor chip, Proceedings Seventh Annual IEEE International Conference on Wafer Scale Integration, Jan. 18–20, 1995, Page(s): 238–247.*

* cited by examiner

*Primary Examiner*—Albert Decady
*Assistant Examiner*—Joseph D. Torres
(74) *Attorney, Agent, or Firm*—Bruce E. Hayden; James H. Philips

(57) ABSTRACT

A plurality of processors in a data processing system share a common memory through which they communicate and share resources. When sharing resources, one processor needs to wait for another processor to modify a specified location in memory, such as unlocking a lock. Memory and bus traffic are minimized during this waiting by first reading and testing the memory location. Then, the memory location is not read and tested again until the local copy of the cache line containing that memory location is invalidated by another processor. This feature is utilized both for a Lock instruction and a Wait for Change instruction, both of which utilize a timer parameter for specifying a maximum number of cycles to wait for another processor to modify the specified location in memory.

12 Claims, 10 Drawing Sheets

COMPUTER PROCESSOR READ/ALTER/REWRITE OPTIMIZATION CACHE INVALIDATE SIGNALS

CROSS REFERENCE TO RELATED APPLICATION

This application is related to our copending patent applications assigned to the assignee hereof:

"GATE CLOSE FAILURE NOTIFICATION FOR FAIR GATING IN A NONUNIFORM MEMORY ARCHITECTURE DATA PROCESSING SYSTEM" by William A. Shelly et al., filed Sep. 30, 1999, with Ser. No. 09/409,456; and "GATE CLOSE BALKING FOR FAIR GATING IN A NONUNIFORM MEMORY ARCHITECTURE DATA PROCESSING SYSTEM" by David A. Egolf et al., filed Sep. 30, 1999, with Ser. No. 09/409,811.

1. Field of the Invention

The present invention generally relates to data processing systems, and more specifically to techniques to detect changes by one processor to memory by another processor.

2. Background of the Invention

Data processing systems invariably require that resources be shared among different processes, activities, or tasks in the case of multiprogrammed systems and among different processors in the case of multiprocessor systems. Such sharing is often not obvious within user programs. However, it is a necessity in operating systems, and is quite common in utility programs such as database and communications managers. For example, a dispatch queue is typically shared among multiple processors in a multiprocessor system. This provides a mechanism that allows each processor to select the highest priority task in the dispatch queue to execute. Numerous other operating systems tables are typically shared among different processes, activities, tasks, and processors Serialization of access to shared resources in a multiprocessor system is controlled through mutual exclusion. This is typically implemented utilizing some sort of hardware gating or semaphores. Gating works by having a process, activity, or task "close" or "lock" a "gate" or "lock" before accessing the shared resource. Then, the "gate" or "lock" is "opened" or "unlocked" after the process, activity, or task is done accessing the shared resource. Both the gate closing and opening are typically atomic memory operations on multiprocessor systems.

There are typically two different types of gates: queued gates and spin gates. Semaphores are examples of queued gates. When a process, activity, or task attempts to "close" a queued gate that is already closed, that process, activity, or task is placed on a queue for that gate, and is dequeued and activated when the gate is subsequently opened by some other process, activity, or task. Queued gates are typically found in situations where the exclusive resource time is quite lengthy, especially in comparison with the time required to dispatch another process, activity, or task.

The second type of gate is a "spin" gate. When a process, activity, or task attempts to "close" a spin gate that is already closed, a tight loop is entered where the processor attempting to close the spin gate keeps executing the "close" instruction until it ultimately is opened by another processor or the processor decides to quite trying. Note that "spin" gates assume a multiprocessor system since the processor "spinning" trying to "close" the spin gate is depending on another processor to "open" the gate. Spin gates are typically found in situations where the exclusive resource time is fairly short, especially in comparison with the time required to dispatch another process, activity, or task. They are especially prevalent in time critical situations.

As noted above, the instructions utilized to open and close gates, in particular spin gates, typically execute utilizing atomic memory operations. Such atomic memory modification instructions are found in most every architecture supporting multiple processors, especially when the processors share memory. Some architectures utilize compare-and-swap or compare-and-exchange instructions (see FIGS. 10 and 11) to "close" gates. The Unisys 1100/2200 series of computers utilizes Test Set and Skip (TSS) and Test Clear and Skip (TCS) to close and open spin gates.

The GCOS® 8 architecture produced by the assignee herein utilizes a Set Zero and Negative Indicators and Clear (SZNC) instruction to "close" a spin gate and a Store Instruction Counter plus 2 (STC2) instruction to subsequently "open" the spin gate. The SZNC sets the Zero and Negative indicators based on the current value of the gate being "closed". It then clears (or zeros) the gate. The next instruction executed is typically a branch instruction that repeats executing the SZNC instruction if the gate being closed was already clear (or contained zero). Thus, the SZNC instruction will be executed repeatedly as long as the spin gate is closed, as indicated by having a zero value. The gate is opened by another processor by storing some non-zero value in the gate cell. In the GCOS 8 architecture, execution of the STC2 instruction to "open" a gate guarantees that the "opened" gate will contain a non-zero value.

One problem that occurs whenever resources are shared between and among processors is that of cache ownership of directly shared data, including locks.

A cache siphon is where the cache copy of a block of memory is moved from one cache memory to another. When more than one processor is trying to get write access to the same word or block of memory containing a gate at the same time to close the gate, the block of memory can "ping pong" back and forth between the processors as each processor siphons the block of memory containing the gate into its own cache memory in order to try to close the gate.

Another problem that arises when directly sharing resources is that in the typical processor architecture, processors repeatedly attempt to close gates or otherwise modify directly shared data until that processor can change that shared data as required. For example, in the case of gates, one processor will bang on the gate until it is opened by another processor.

At first glance this may not seem like a problem since the processor "banging" at a lock cannot do anything else anyway until it succeeds in getting the gate locked. However, this constant "banging" on the gate does introduce significant overhead in bus and cache traffic. It would thus be advantageous to reduce this bus and cache traffic when one processor is waiting for another processor to modify a shared location in memory.

BRIEF DESCRIPTION OF THE DRAWINGS

The features and advantages of the present invention will be more clearly understood from the following detailed description taken in conjunction with the accompanying figures where like numerals refer to like and corresponding parts and in which.

DETAILED DESCRIPTION

A plurality of processors in a data processing system share a common memory through which they communicate and share resources. When sharing resources, one processor needs to wait for another processor to modify a specified location in memory, such as unlocking a lock. Memory and bus traffic are minimized during this waiting by first reading and testing the memory location. Then, the memory location is not read and tested again until the local copy of the cache line containing that memory location is invalidated by another processor. This feature is utilized both for a Lock instruction and a Wait for Change instruction, both of which utilize a timer parameter for specifying a maximum number of cycles to wait for another processor to modify the specified location in memory.

In the following description, numerous specific details are set forth such as specific word or byte lengths, etc. to provide a thorough understanding of the present invention. However, it will be obvious to those skilled in the art that the present invention may be practiced without such specific details. In other instances, circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

The term "gate" and "lock" are used interchangeably herein. The terms "close" and "lock" as applied to gates or locks are used interchangeably herein. The terms "open" and "unlock" as applied to gates or locks are used interchangeably herein. In a typical situation in a data processing system, exclusive access to a shared resource is provided by "closing" or "locking" a "gate" or "lock" before accessing the shared resource. Then, the "gate" or "lock" is "opened" or "unlocked" after accessing the shared resource, allowing another task, activity, process, or processor to access the shared resource.

Figure 1:
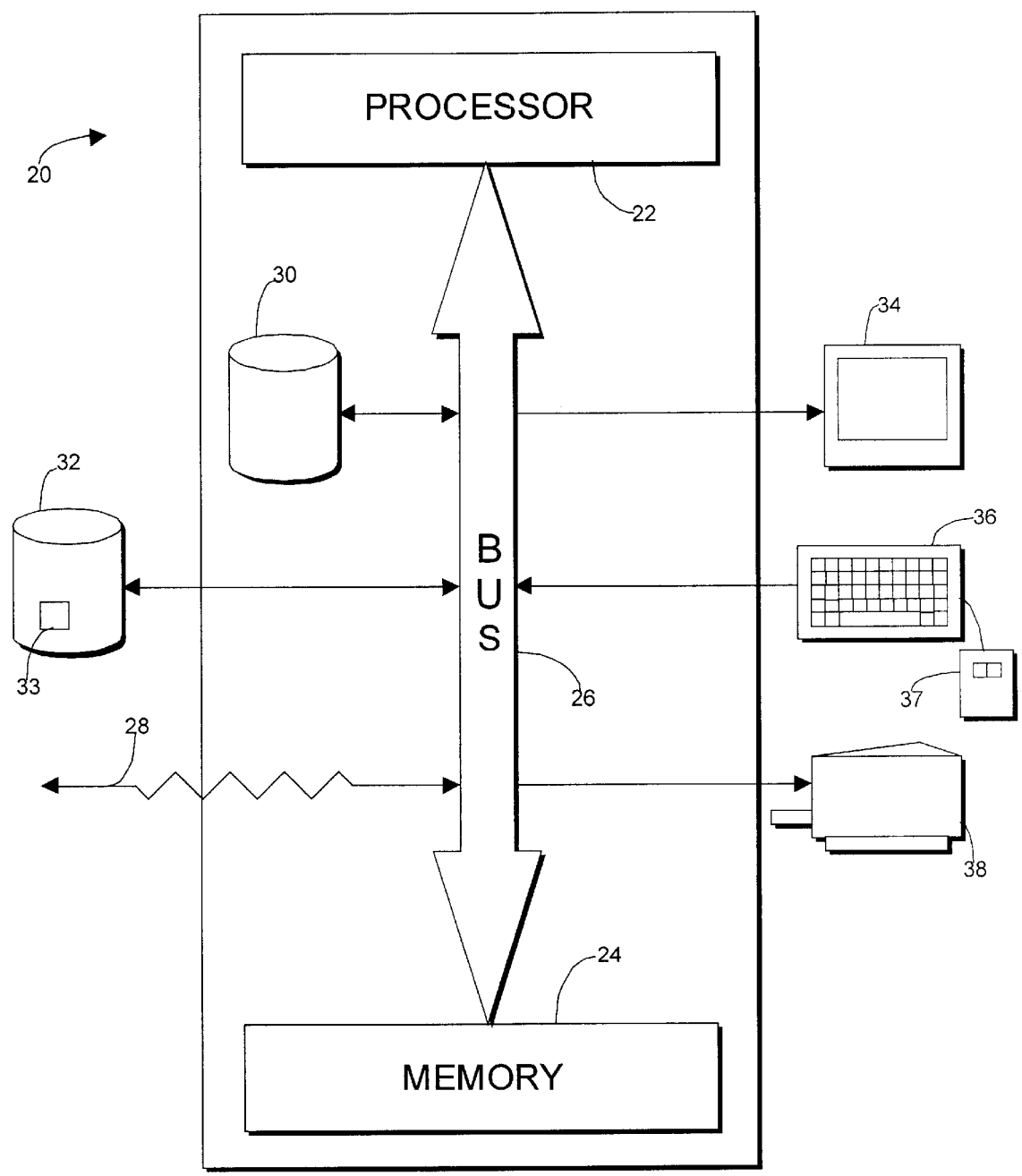
FIG. 1 is a block diagram illustrating a General Purpose Computer, in accordance with the present invention.

FIG. 1 is a block diagram illustrating a General Purpose Computer 20. The General Purpose Computer 20 has a Computer Processor 22, and Memory 24, connected by a Bus 26. Memory 24 is a relatively high speed machine readable medium and includes Volatile Memories such as DRAM, and SRAM, and Non-Volatile Memories such as, ROM, FLASH, EPROM, EEPROM, and bubble memory. Also connected to the Bus are Secondary Storage 30, External Storage 32, output devices such as a monitor 34, input devices such as a keyboard 36 (with mouse 37), and printers 38. Secondary Storage 30 includes machine-readable media such as hard disk drives, magnetic drum, and bubble memory. External Storage 32 includes machine-readable media such as floppy disks, removable hard drives, magnetic tape, CD-ROM, and even other computers, possibly connected via a communications line 28. The distinction drawn here between Secondary Storage 30 and External Storage 32 is primarily for convenience in describing the invention. As such, it should be appreciated that there is substantial functional overlap between these elements. Computer software such test programs, operating systems, and user programs can be stored in a Computer Software Storage Medium, such as memory 24, Secondary Storage 30, and External Storage 32. Executable versions of computer software 33, can be read from a Non-Volatile Storage Medium such as External Storage 32, Secondary Storage 30, and Non-Volatile Memory and loaded for execution directly into Volatile Memory, executed directly out of Non-Volatile Memory, or stored on the Secondary Storage 30 prior to loading into Volatile Memory for execution.

Figure 2:
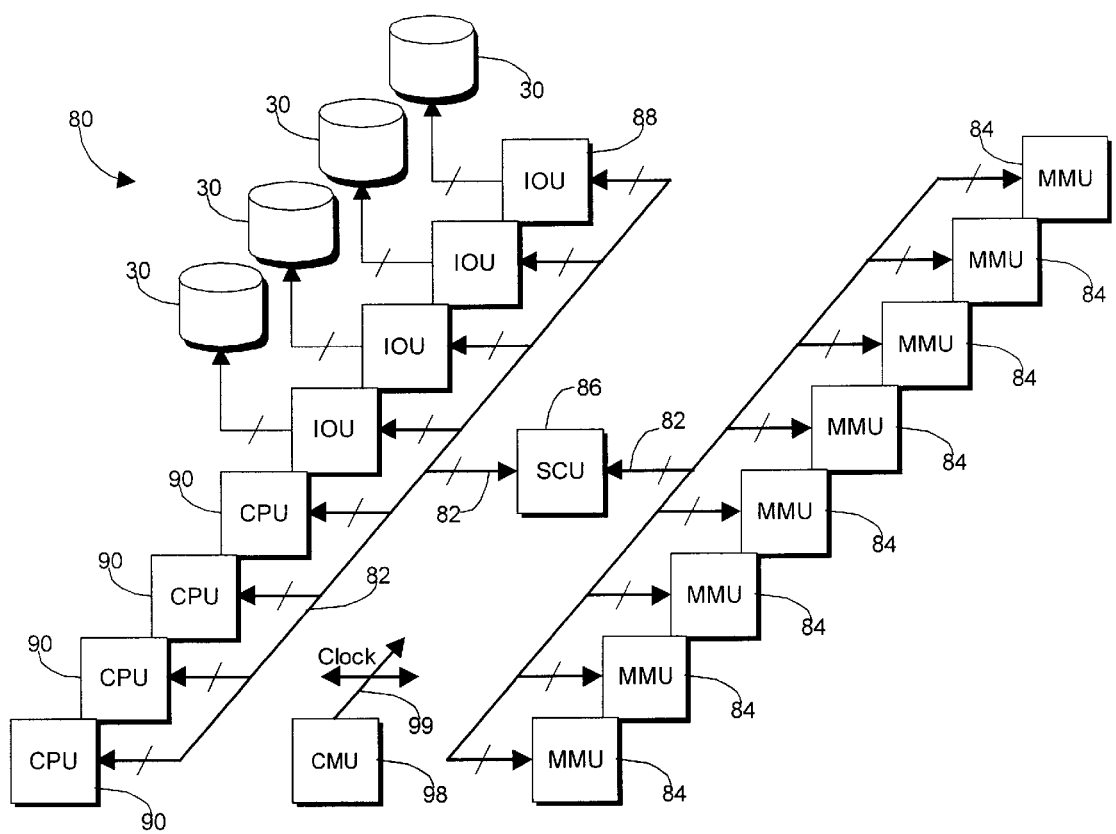
FIG. 2 is a block diagram of a more detailed view of a multiprocessor data processing system, in accordance with the present invention.

FIG. 2 is a block diagram of a more detailed view of a multiprocessor data processing system, in accordance with the present invention. The multiprocessor data processing system 80 comprises a plurality of modules coupled together via an intramodule bus 82 controlled by a storage control unit 86. In the preferred embodiment, each such module 84, 88, 90 is contained on a single board, with the boards connecting into a backplane. The backplane includes the intramodule bus 82. In the representative data processing system 80 shown in FIG. 2, sixteen modules are shown. The system includes four (4) processor ("CPU") modules 90, four (4) Input/Output ("IOU") modules 88, and eight (8) memory ("MMU") modules 84. Each of the four Input/Output ("IOU") modules 88 is shown coupled to secondary storage 30. This is representative of the function of such IOU modules 88. Each IOU module 88 will typically contain a plurality of IOU processors (not shown). Each of the eight memory modules 84 contains memory 24 and a memory controller (not shown). This memory 24 (see FIG. 1) is typically Dynamic Random Access Memory (DRAM). Large quantities of such memory 24 are typically supported. Also shown in FIG. 2 is a Clock Management Unit 98, which supplies a standard clock signal 99 to the remainder of the system 80. As clock signals are ubiquitous in digital computer architectures, the clock signal 99 will not be shown further herein except where relevant. Note also that in the preferred embodiment, multiple Clock Management Units 98 are utilized to provide a redundant clock signal 99.

Figure 3:
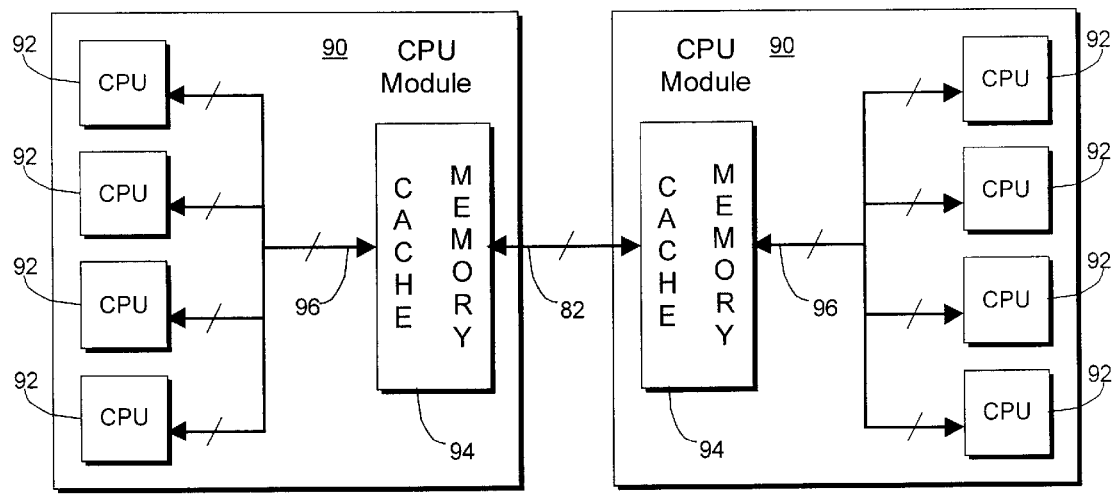
FIG. 3 is a block diagram illustrating a pair of processor (CPU) modules as shown in FIG. 2.

FIG. 3 is a block diagram illustrating a pair of processor (CPU) modules 90 as shown in FIG. 2. The two CPU modules 90 are coupled together and communicate over the intramodule bus 82. The CPU modules 90 each contain a plurality of processors (CPU) 92 and a Level 2 (L2) cache memory system 94 shared among the processors 92. In the preferred embodiment, each processor (CPU) module 90 contains up to four (4) processors (CPU) 92. The processors 92 and their L2 cache memory system 94 are coupled together and communicate over an intraprocessor bus 96.

The Level 2 (L2) cache memory system 94 is shared among the processors 92 in a CPU module 90. The L2 cache memory system 94 maintains cache copies of data loaded into those processors 92. The cache memory system 94 is considered here a Level 2 cache and is coupled to and communicates with the storage control system (SCU) 86 over the intramodule bus 82 in order to maintain cache coherency between Level 2 (L2) cache memories 94 in each of the processor (CPU) modules 90, as well as between cache Level 1 (L1) cache memories 256 in each of the processors 92, and on the IOU modules 88. The SCU 86 also maintains coherency between the various cache memories 94, 256, and the typically slower speed memory in the MMU modules 84. In the preferred embodiment, a single block of memory or cache line will be owned for update by a single cache or memory at potentially each level in the memory hierarchy. Thus, a given memory block or cache line may be owned by one Level 1 (L1) cache 256, by one Level 2 (L2) cache 94, and by one MMU 84. However note that that a cache line can be held for read (only) by multiple caches in the hierarchy.

Figure 4:
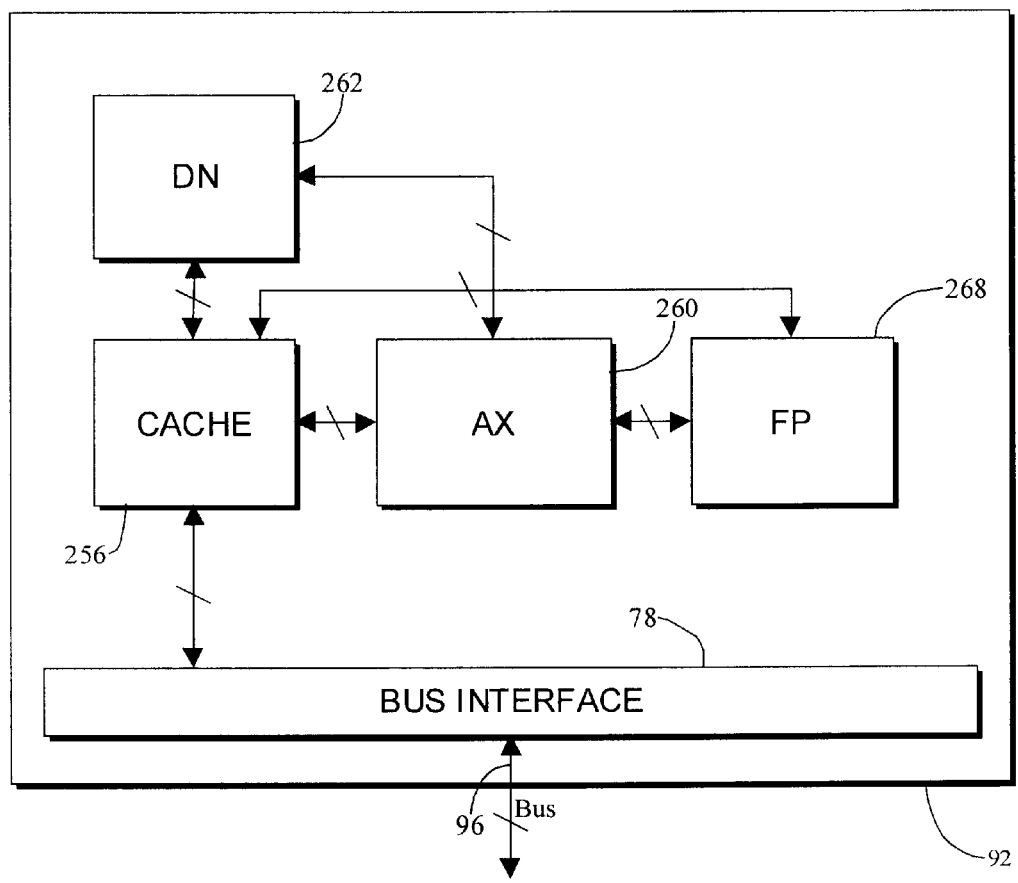
FIG. 4 is a block diagram of a processor shown in FIG. 3.

FIG. 4 is a block diagram of a processor 92 shown in FIG. 3. The processor 92 communicates with the bus 96 utilizing a bus interface 78. The bus interface is bidirectionally coupled to a unified local (level 2 or L2) cache 256. Cache memories, such as this unified local cache 256, are typically constructed as high speed Static Random Access Memories (SRAM). In the preferred embodiment, the local cache 256 is incorporated on the same integrated circuit as the remainder of the processor 92. The local cache 256 is the primary block that interfaces with the bus interface 78. Data and instructions are loaded via the bus 96 into the local cache 256, and data is written back from the local cache 256 via the bus 96. Implementations which separately cache instructions and data do not modify this embodiment.

The local cache 256 is bidirectionally coupled to an AX module 260. The AX unit 260 provides the bulk of the functionality of the processor 92, including instruction decode. The AX unit 260 is bidirectionally coupled to and controls execution of a floating point (FP) unit 268 and a decimal/numeric (DN) unit 262. In the preferred embodiment, the floating-point unit 268 performs both floating-point operations, and fixed-point multiplications and divisions. It is bidirectionally coupled to the local cache 256. The decimal/numeric (DN) unit 262 performs decimal and string operations. It is bidirectionally coupled to the local cache 256, allowing it to operate relatively autonomously from the AX unit 260. Rather, once decimal or string operations are initiated in the DN unit 262, the DN unit 262 is driven by operand availability in the local cache 256.

Figure 5:
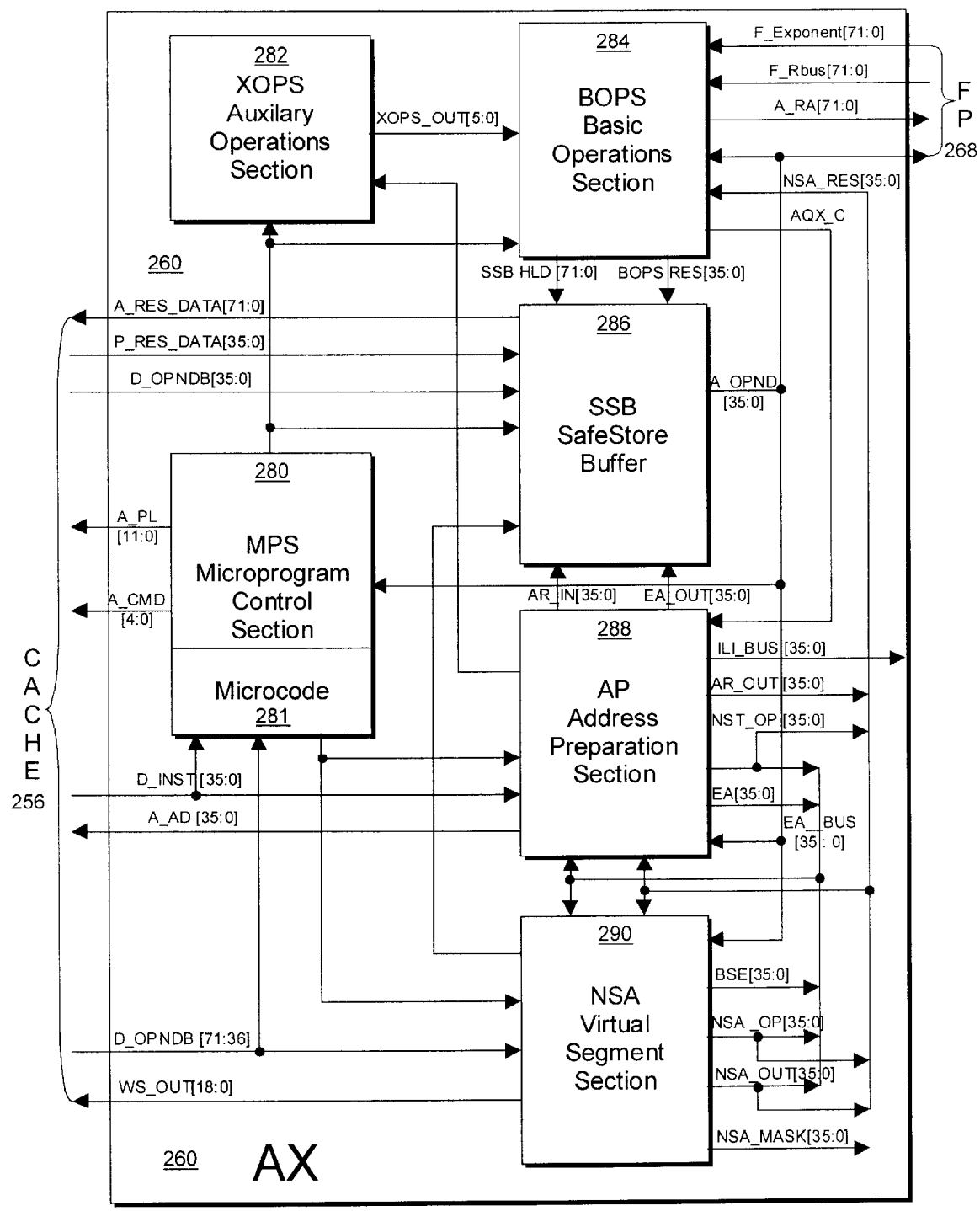
FIG. 5 is a block diagram of an AX unit in the processor shown in FIG. 4.

FIG. 5 is a block diagram of an AX unit 260 in the processor 92 shown in FIG. 4. The AX unit 260 comprises a Microprogram Control Section (MPS) unit 280, an Auxiliary Operations Section (XOPS) 282, a Basic Operations Section (BOPS) 284, a Safe Store Buffer (SSB) 286, an Address Preparation (AP) section 288, and a NSA Virtual Segment Section 290. The NIPS 280 is bidirectionally coupled to and receives instructions from the local cache 256. The MPS 280 performs instruction decode and provides microprogram control of the processor 92. The microprogram control utilizes a microengine executing microcode 281 stored in both dynamic and static memories in response to the execution of program instructions. The MPS 280 is bidirectionally coupled to and controls operation of the Auxiliary Operations Section (XOPS) 282, the Basic Operations Section (BOPS) 284, the floating point (FP) unit 268, the decimal/numeric (DN) unit 262 (not shown here), the Address Preparation (AP) section 288, and the NSA Virtual Segment Section 290. The Basic Operations Section (BOPS) 284 is used to perform fixed point arithmetic, logical, and shift operations. The Auxiliary Operations Section (XOPS) 282 performs most other operations. The Address Preparation (AP) section 288 forms effective memory addresses utilizing virtual memory address translations. The NSA Virtual Segment Section 290 is bidirectionally coupled to and operates in conjunction with the AP section 288, in order to detect addressing violations.

The Safe Store Buffer (SSB) 286 stores the current status of the processor 92 environment, including user and segment registers, for the purpose of changing processor state. The SSB 286 is coupled to and receives signals from the BOPS 284, the AP section 288, the MPS 280, and the NSA 290. The SSB 286 is bidirectionally coupled to the local cache 256, allowing SSB 286 frames to be pushed out to local cache 256 when entering a new processor environment, and pulled back from local cache 256 when returning to an old processor environment.

Returning to FIG. 3, in the preferred embodiment up to four processors 92 share a Level 2 or "L2" cache 94 in each processor (CPU) module 90. The L2 cache 94 caches lines of memory from the MMU modules 84. The access can be either read-only or read/write. In the case of read-only access, the L2 cache 94 line of memory may be a copy of the same cache line in another L2 cache 94. However, read/write access requires exclusive control of the block (or line) of memory. In the preferred embodiment, acquiring read/write access is termed "read-alter-rewrite" (RAR) access. If the cache line is not in a processor's L2 cache memory 94, but is rather located in another L2 cache memory 94 in another processor module 90, it is "siphoned" into the processor's L2 cache memory 94. The L2 caches 94 communicate across the system bus 82 utilizing a MESI bus protocol. This is described in more detail starting on page 168 of Pfister. The cache coherence architecture is similar to the snoopy cache architecture described starting at page 166 in Pfister. As noted above, "siphoning" is when one processor pulls a cache block or line into either its L1 cache memory 256, or its L2 cache memory 94.

In the prior art, whenever a processor 92 attempted to close a spin gate, it would acquire read/write (Read/Alter/Write or RAW) access to the block of memory containing the spin gate. Similarly, whenever a processor 92 would open a spin gate, it would also acquire read/write (or RAW) access to the block containing the spin gate. When a gate is in heavy use, multiple processors may repeatedly attempt to shut it while it is closed by yet another processor. Each such attempt to close the gate employs a read/write operation. This results in too much cache siphon activity since each gate test must acquire write permission to the cache line.

A first solution to these excessive gate siphons is to implement "friendly" gating. In "friendly" gating, a test is first made whether or not the spin gate is open. This gate "snooping" only requires read-only access to the block of memory or cache line containing the spin gate. A read-only copy of the cache line containing the gate can be made from the cache line in another cache memory 94, 256 and retained in the Level 1 (L1) cache 256 of the processor 92 until the cache line is updated by the opening processor 92. This update will cause the local read-only copy of cache line containing the gate to be invalidated. Then, if the spin gate is determined to be open, an attempt is made to actually close the spin gate. This requires read/write (RAW) access. This method significantly reduces the number of RAW cache siphons required since the RAW cache siphons are suppressed whenever the spin gate is determined by the gate "snoop" to be already closed.

Figure 6:
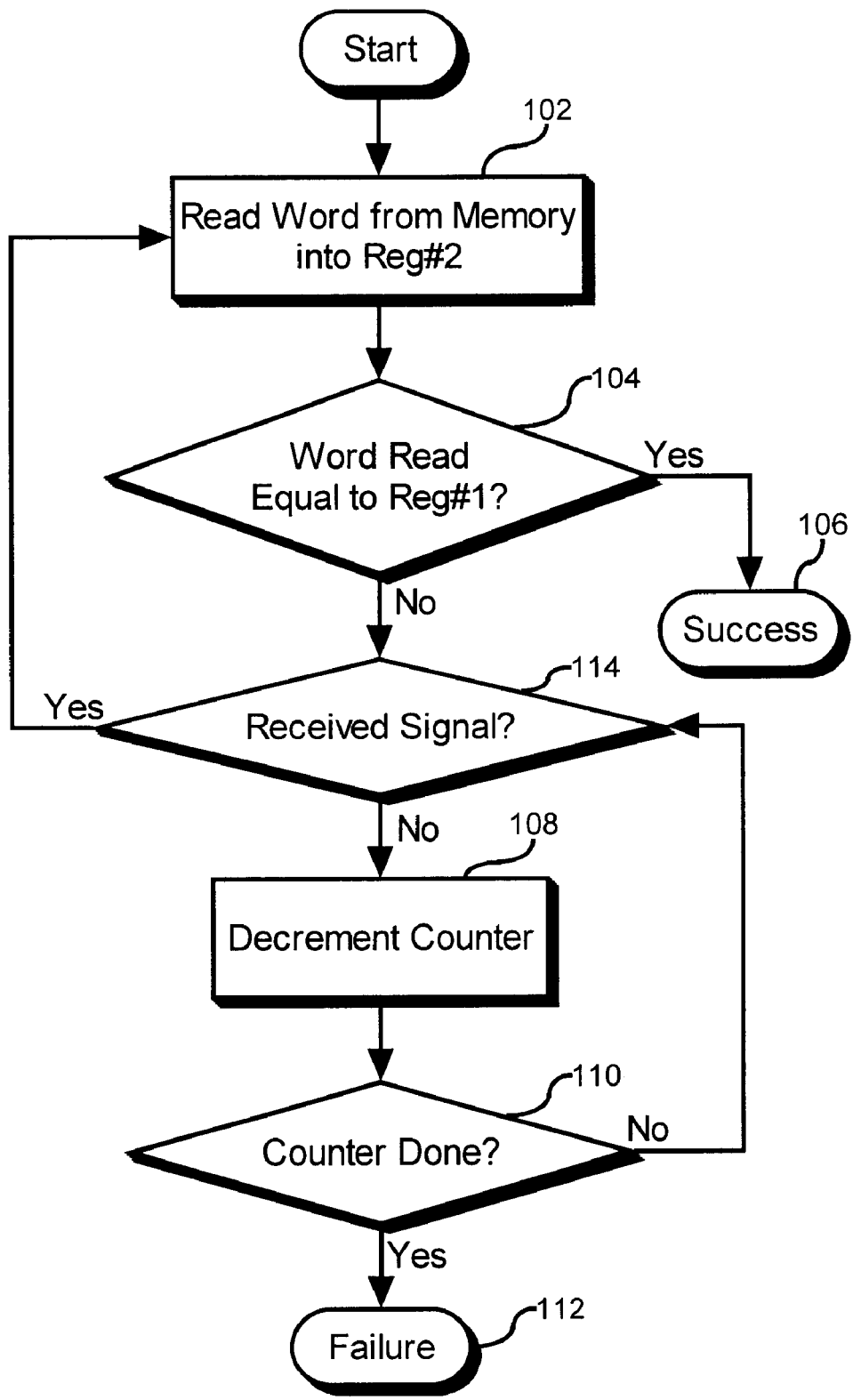
FIG. 6 is a flowchart of a Wait for Change Instruction, in accordance with a preferred embodiment of the present invention.

FIG. 6 is a flowchart of a Wait for Change (or Wait until Change) Instruction, in accordance with a preferred embodiment of the present invention. The Wait for Change Instruction delays execution of the processor on which the instruction has been executed until either a specified location in memory (Word#1) has been changed, or the number of cycles specified by a timer or counter has been exhausted. The instruction is initiated utilizing two or more registers and the address of a location in memory (Word#1). A first register (Reg#1) contains the contents to be compared to the word in memory (Word#1). The contents of that memory location (Word#1) upon completion of the instruction execution is returned in the second register (Reg#2). A third register may be utilized to provide a repeat or cycle count. A fourth register may be utilized in alternate embodiments to contain a mask.

The flowchart starts by entering a first loop, which begins by reading the specified Word from memory into a second register (Reg#2), step 102. The word just read from memory is then compared to the contents of a first register (Reg#1), step 104. If the word read from the memory differs from the contents of the first register (Reg#1), step 104, instruction execution is complete, and success is indicated, step 106.

If the word read from memory is equal to the contents of the first register, step 104, a second loop is entered, which starts by testing whether the processor has received a signal from the cache system invalidating the cache line in which the Word in memory is located, step 114. If the cache invalidate signal has been received, step 114, the instruction repeats the first loop, starting with reading the word from memory into the second register (Reg#2), step 102. Otherwise, if the cache line invalidate signal has not been received, step 114, a counter is decremented, step 108, and tested, step 110. If the counter is not exhausted, step 110, the second loop is repeated, starting with the test for receipt of the cache line invalidate signal, step 114. Otherwise, when the counter is exhausted, the instruction exits, indicating failure, step 112.

In the preferred embodiment, instruction success, step 106, or failure, step 112, is indicated by setting or clearing a condition code bit or flag. This condition code bit can then be tested with a conditional branch instruction in order to determine what action to taken (see FIG. 12 below). Alternatively, the contents of the two registers (Reg#1, Reg#2) can be compared. In that case, if the two registers have the same contents, the instruction failed. In another embodiment, the repeat count is returned in the register that it was provided in, and if not exhausted, instruction failure is indicated. This embodiment, and any others that return the remainder of the timer or repeat count in the original repeat count register, has an advantage that it can be interrupted and restarted safely.

In the preferred embodiment, a signal is generated by preferably the level 1 (L1) cache 256 indicating that the cache system has invalidated the cache line containing the location being monitored for change (Word#1). The processor will typically read a copy of the word (Word#1) from a read-only copy of the cache line containing the word in its L1 cache 256, step 102. If the contents of that word (Word#1) from the read-only L1 cache 256 copy of that word do not differ from the first register (Reg#1) when tested, step 104, the contents of that word (Word#1) will not differ until the read-only copy of the cache line containing that word (Word#1) is invalidated by a write into a word in that cache line by another processor 92. In alternate embodiments, this functionality is obtained by reading the appropriate L1 cache 256 tags to determine whether the cache line containing that word (Word#1) has been invalidated, or through receipt of a cache invalidate signal from another processor 92, or from a level 2 (L2) cache 94. In other embodiments, this functionality is obtained by use and testing of a special signal or receipt of special cache commands from either an L1 cache 256, or a L2 cache 94.

In an alternate embodiment, only specified bits of the first register (Reg#1) are compared to the corresponding bits in the word to be tested (Word#1). This would typically be done by specify a mask in a mask register, which mask is ANDed to both the first register (Reg#1) and the contents of the word (Word#1) before being compared. The mask can be provided as either another register specified explicitly or implicitly in the instruction, or as a fixed mask register. For example, in the Unisys 1100/2200 architecture, register R1 is a repeat register utilized in steps 108 and 110, while register R2 is a mask register ANDed to both operands before making the comparison in step 104. By use of such a mask, this instruction can be combined (see FIG. 12) with a Compare and Exchange instruction (see FIGS. 10 and 11) to provide most gating functions.

Figure 7:
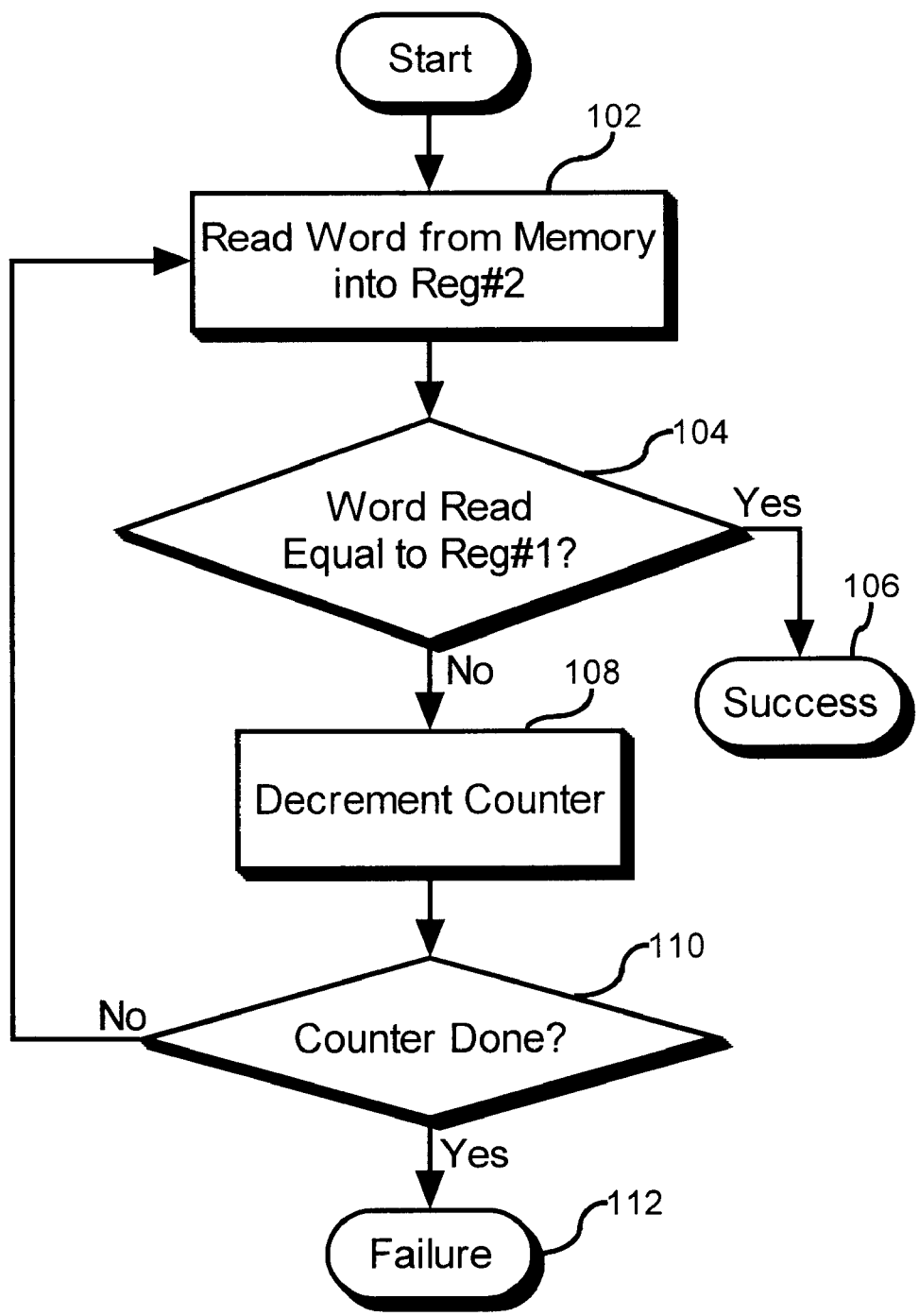
FIG. 7 is a flowchart of a Wait for Change Instruction, in accordance with an alternate embodiment of the present invention.

FIG. 7 is a flowchart of a Wait for Change Instruction, in accordance with an alternate embodiment of the present invention. It has identical parameters and register usages as the preferred embodiment of the instruction shown in FIG. 6. However, the testing of the cache line invalidate signal in step 114 is eliminated. Thus, this instruction can be implemented in processors that do not have potential access to such a cache line invalidate signal.

The instruction starts by reading the word (Word#1) from memory into the second register (Reg#2), step 102. The word just read from memory, step 102, is compared to the contents of the first register (Reg#1), step 104. If the word just read from memory (Word#1) is different from the contents of the first register (Reg#1), step 104, the instruction exits, indicating success, step 106.

Alternatively, the counter is decremented, step 108, and tested for exhaustion, step 110. If the counter is exhausted, step 110, the instruction exits, indicating failure, step 112. Otherwise, the instruction loops, starting at reading the word from memory (Word#1) into the second register (Reg#2), step 102.

Figure 8:
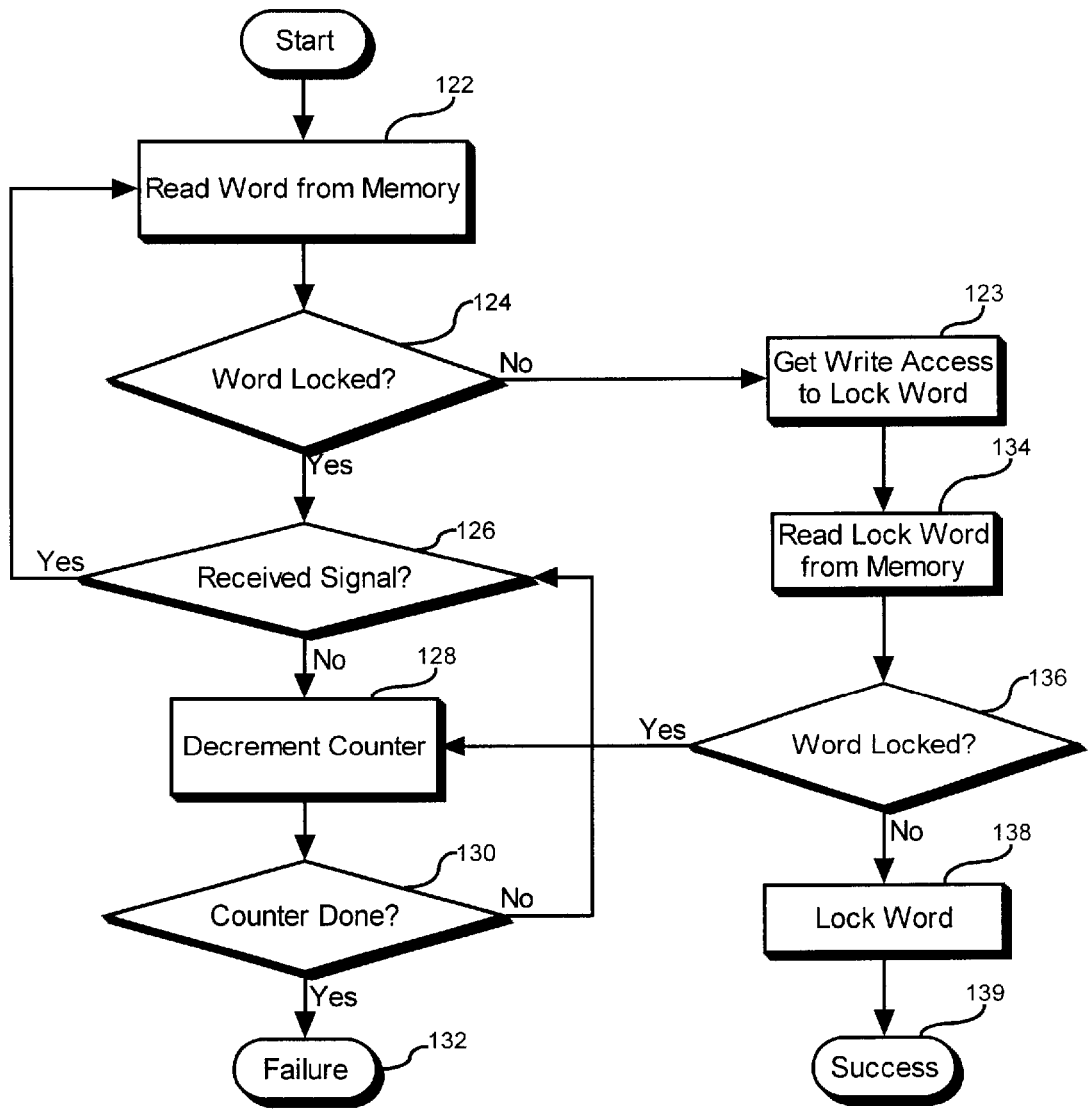
FIG. 8 is a flowchart of a Lock Instruction, in accordance with a preferred embodiment of the present invention.

FIG. 8 is a flowchart of a Lock Instruction, in accordance with a preferred embodiment of the present invention. The Lock Instruction delays execution of the processor on which the instruction has been executed until either a gate in memory (Word#1) has been locked by this processor 92, or the number of cycles specified by a timer or counter parameter has been exhausted. The instruction is initiated providing the address of a location in memory (Word#1) for the gate. A first register may be utilized to provide a repeat or cycle count.

The instruction starts by entering a first loop which starts by reading the gate word (Word#1) from memory, step 122. If the word is locked, step 124, a second loop is entered, which starts by testing whether a cache invalidate signal has been received for the cache line containing the gate word, step 126. If the cache invalidate signal has not bee received, step 126, a counter is decremented, step 128, and tested for exhaustion, step 130. If the counter has not been exhausted, step 130, the second loop is repeated, starting with the testing for the cache invalidate signal in step 126. Otherwise, the instruction exits, indicating failure, step 132.

If the gate in Word#1 is unlocked, step 124, the cache line containing the gate word is acquired with write permission, step 123. The gate word is then read from memory (Word#1), step 134, and tested for being locked, step 136. If the gate is not locked, step 136, the gate word is written back to memory locked, step 138. The instruction then exits, indicating success, step 139.

However, if the gate word was determined to now be locked, step 136, the second loop is entered, starting preferably with decrementing the counter, step 128, or alternatively, testing for having received a cache line invalidate signal or command, step 126.

Figure 9:
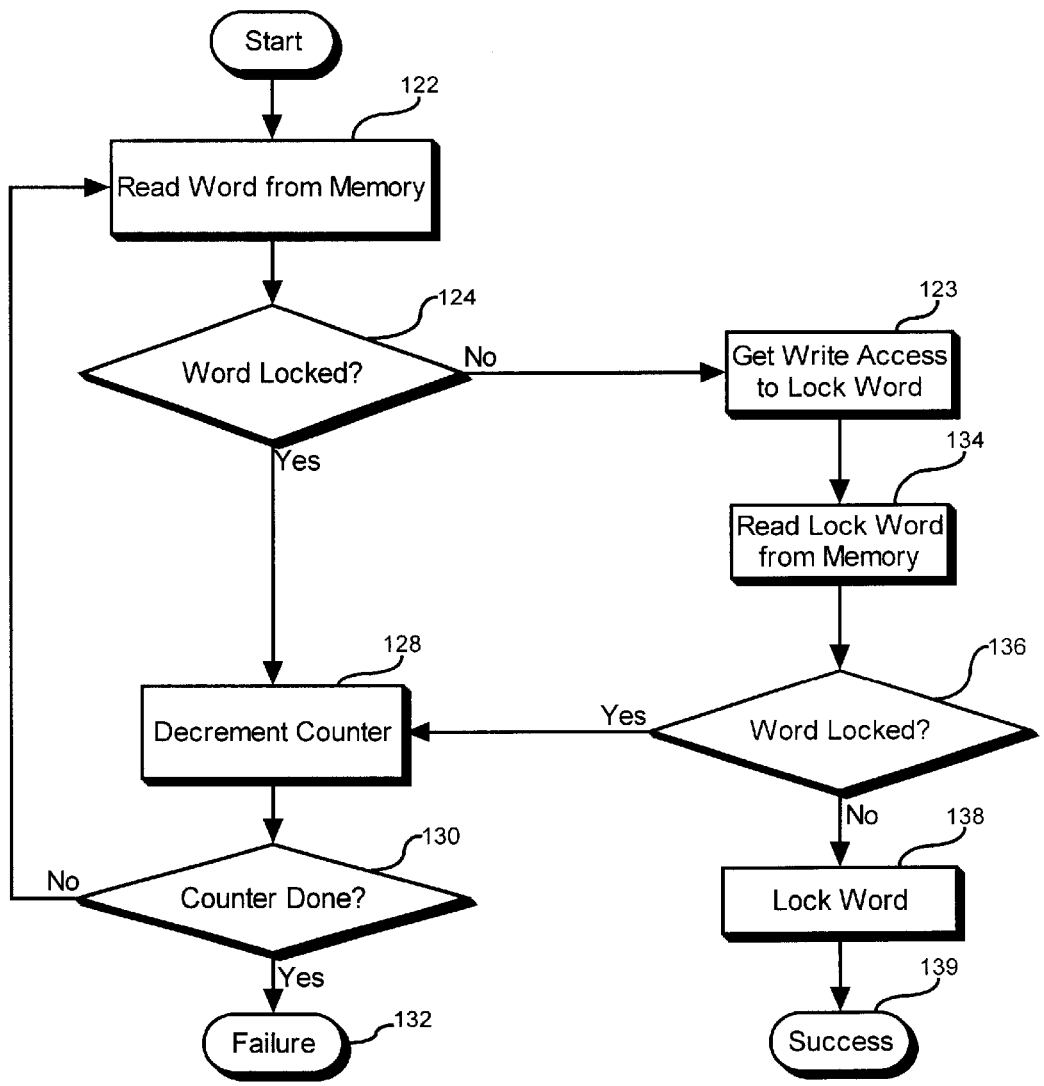
FIG. 9 is a flowchart of a Lock Instruction, in accordance with an alternate embodiment of the present invention.

FIG. 9 is a flowchart of a Lock Instruction, in accordance with an alternate embodiment of the present invention. It is identical with the preferred embodiment shown in FIG. 8, except that the testing for receipt of a cache line invalidate signal or command, step 126 is eliminated.

Thus, the instruction starts by entering a first loop which starts by reading the specified gate word (Word#1) from memory, step 122, and testing it for being locked, step 124. If the gate word is locked, step 124, the counter is decremented, step 128, the counter is tested for exhaustion, step 130, and if exhausted, the instruction exits indicating failure, step 132. Otherwise, if the gate word is determined to be unlocked, step 124, the flowchart is identical to the flowchart in FIG. 8, with the proviso that, after reading the lock word for memory step 134, if the attempt to lock the gate word (Word#1) fails, step 136, the counter is decremented, step 128, and tested for exhaustion, step 130.

The previous FIGS. would appear to imply sequential operation. However, this is for illustrative purposes only. In the preferred embodiment, these instructions would be implemented as microcode 281. As such, some of the functions required for the execution of these instructions would typically be done in parallel.

Similarly, the previous FIGS. would seem to imply that multiple instruction cycles are executed. Again, this is for ease of illustration. In the preferred embodiment, the counter (or timer) is decremented once per cycle. Ignoring instruction setup time, the timing of the remainder of the instruction steps utilize the parallelism noted above to conform to this requirement. Thus, the counter or timer value for these instructions provides a time, typically defined in terms of machine cycles, in which the instruction attempts to perform its designated function. Use of this timer value prevents "hanging" a processor when the action it is awaiting by another processor never occurs. For example, a lock may never be unlocked. However, in alternate embodiments, a prespecified counter or timer value can be utilized to specify that the instruction is not to be timed.

These instructions will typically be utilized primarily by operating system functions. They may be executed with interrupts locked out. However, they may also be executed with interrupts enabled. By providing the remaining counter or timer value in the register in which it was originally provided to the instruction, these instructions can be easily restarted after interrupt processing, even if other tasks have executed during that time.

As with the mask register disclosed above, the timer or counter value would preferably be specified for the instructions in a register. The register may be explicitly or implicitly specified within the encoding of the instruction, or it may be a fixed repeat register, such as the use of the R1 repeat register utilized by the Unisys 1100/2200 architecture.

Figure 10:
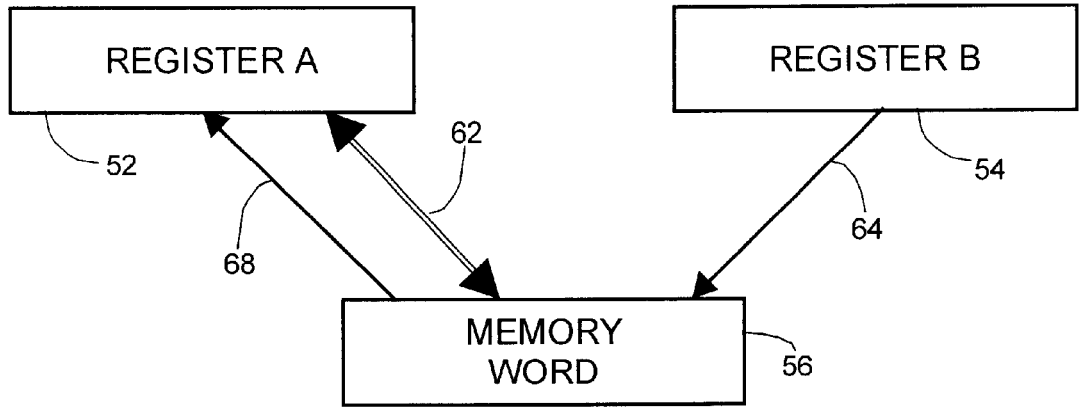
FIG. 10 is a block diagram that illustrates operation of a Compare and Exchange type of instruction.
Figure 11:
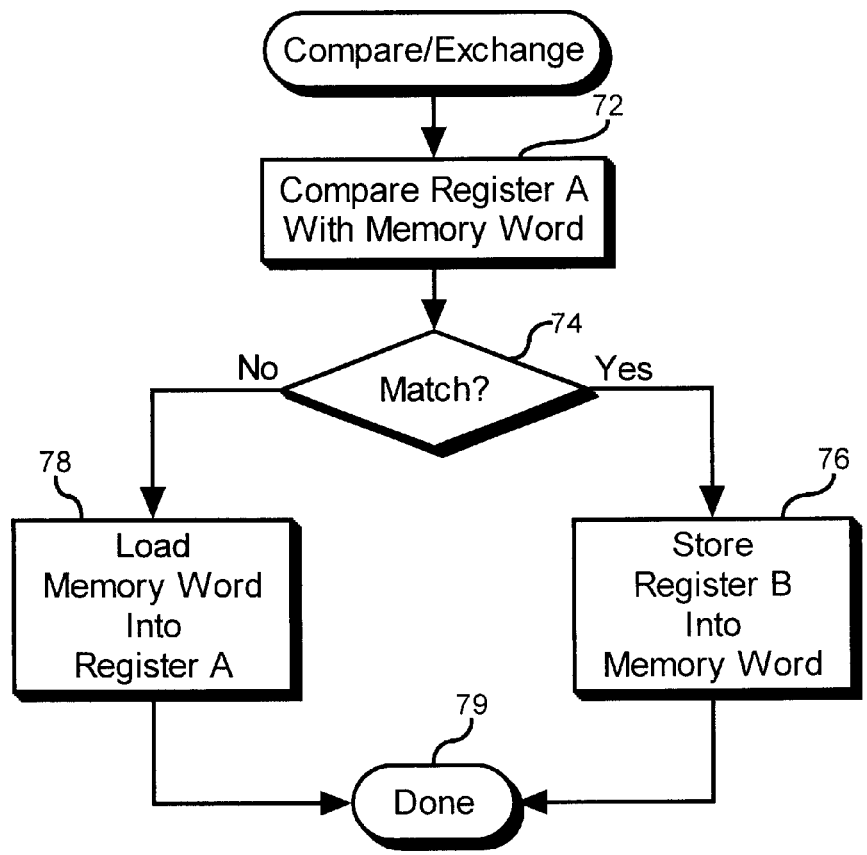
FIG. 11 is a flowchart that illustrates operation of a Compare and Exchange type of instruction.

FIG. 10 is a block diagram that illustrates operation of a Compare and Exchange type of instruction. FIG. 11 is a flowchart that illustrates operation of a Compare and Exchange type of instruction. A value in a first register (Register A) 52 is compared 62 with a word in memory 56, step 72. If the word in memory 56 matches 62 the word in Register A 52, step 74, the contents of a second register (Register B) 54 are written 64 to the memory word 56 in the same uninterrupted single memory cycle, step 76 to complete the instruction, step 79. If the contents of the memory word 56 do not match the contents of Register A 52, step 74, the contents of the memory word 56 are written 68 into that Register A 52, step 78 to complete the instruction, step 79. In the case of the Intel IA-32 CMPXCHG8B instruction referenced above, a ZF flag in a status register is set if the word in memory 56 matches 62 the word in register A 52, and is cleared if the word in memory 56 does not match 62 the word in register A 52. This flag may be used by subsequent conditional branch instructions.

Figure 12:
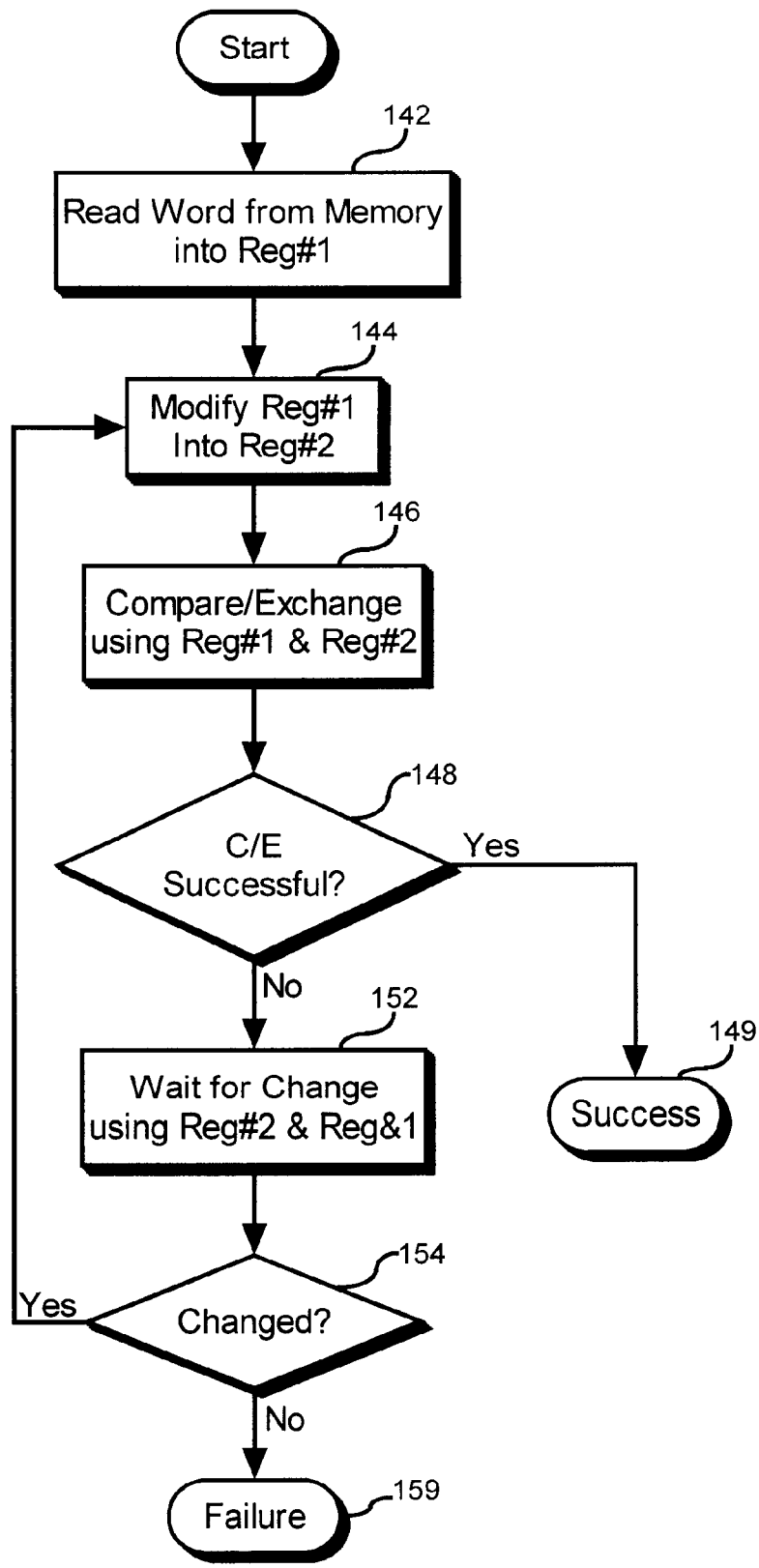
FIG. 12 is a flowchart illustrating usage of a Wait for Change instruction with a Compare and Exchange instruction, in accordance with a preferred embodiment of the present invention.

FIG. 12 is a flowchart illustrating usage of a Wait for Change instruction with a Compare and Exchange instruction, in accordance with a preferred embodiment of the present invention. The flowchart starts by reading a specified word (Word#1) into a first register (Reg#1), step 142. A loop is then entered, which starts with modifying the contents of the first register (Reg#1) into a second register (Reg#2), step 144. A compare and exchange instruction (see FIG. 1) is then executed, step 146, attempting to atomically read/alter/rewrite the contents of the second register (Reg#2) if equal to the contents of the specified word (Word#1) in memory, step 146. The contents of the specified word in memory (Word#1) are preferably returned in the first register (Reg#1).

The success of the compare and exchange instruction is then tested, step 148, and if successful, the flowchart exits indicating success, step 149. Otherwise, when the compare and exchange instruction failed, step 148, a Wait for Change instruction (see FIG. 6) is executed, step 152, utilizing the second register (Reg#2) and the first register (Reg#1). The Wait for Change instruction terminates when either the specified word (Word#1) differs from the contents of the second register (Reg#2), or the counter is exhausted. Success of the Wait for Change instruction is then tested, step 154, and if successful, indicating that the specified word in memory (Word#1) has been changed, the loop is repeated, starting with modifying the first register (Reg#1) into the second register (Reg#2), step 144. Alternatively, when the Wait for Change counter has been exhausted, the flow chart exits, indicating failure, step 159.

The flowchart in FIG. 12 illustrates a methodology to efficiently update a specified location in memory (Word#1) when waiting for another processor to modify the location. The amount of bus and cache traffic is significantly reduced by only reading the word from memory when the cache line containing it has been invalidated. This methodology can be easily modified for use with gate locking and unlocking.

Those skilled in the art will recognize that modifications and variations can be made without departing from the spirit of the invention. Therefore, it is intended that this invention, encompass all such variations and modifications as fall within the scope of the appended claims.

Claim elements and steps herein have been numbered and/or lettered solely as an aid in readability and understanding. As such, the numbering and/or lettering in itself is not intended to and should not be taken to indicate the ordering of elements and/or steps in the claims.

What is claimed is:

1. A method for waiting until a specified location in a memory ceases to have a certain value; wherein said method comprises:
   A) testing the specified location in the memory by:
      1) testing whether a contents of the specified location in the memory are in a gate open state or a gate closed state; and
      2) indicating that step (A) failed When the contents of the location in the memory are in the gate closed state; and
   B) waiting for a cache invalidate signal for a cache line including the location in the memory when the testing in step (A) fails.

2. The method in claim 1 which further comprises:
   C) repeating step (A) after the waiting in step (B) is complete.

3. The method in claim 1 which further comprises:
   C) decrementing a timer;
   D) testing whether the timer is exhausted; and
   E) repeating steps (C) and (D) if the timer in step (D) is not exhausted.

4. The method in claim 1 wherein:
   the testing in step (A) comprises:
      1) comparing the contents of the specified location in the memory against a register; and
      2) indicating that step (A) failed when the contents of the specified location in the memory matches the contents of the register.

5. The method in claim 1 wherein:
   step (A) further comprises:
      1) ANDing the contents of the specified location in the memory with a mask to form a masked contents of the memory;
      2) ANDing the contents of the register with the mask to form a masked contents of the register;
      3) comparing the masked contents of the memory against the masked contents of the register; and
      4) indicating that step (A) failed when the masked contents of the register are the same as the masked contents of the register.

6. A processor for detecting changes to memory made by another processor comprising:
   A) a means for testing a specified location in a memory for a specified value, said means for testing comprising:
      1) a means for testing whether a contents of the specified location in the memory are in a gate open state or a gate closed state; and
      2) a means for indicating that means (A) failed when the contents of the specified location in the memory are in the gate closed state;
   B) a means for receiving a cache invalidate signal; and
   C) a means for waiting for the cache invalidate signal for a cache line that includes the specified location in the memory when the testing in means (A) fails.

7. The processor in claim 6 which further comprises:
   D) a means for repeating means (A) after the waiting in means (C) is complete.

8. The processor in claim 6 which further comprises:
   D) a means for decrementing a timer;
   E) a means for testing whether the timer is exhausted; and
   F) a means for repeating means (D) and (E) if the turner in means (E) is not exhausted.

9. The processor in claim 8 which further comprises:
   G) a register for providing a timer value for use as the timer in means (D) and (E).

10. The processor in claim 6 wherein:
    means (A) further comprises:
       1) a means for ANDing the contents of the specified location in the memory with a mask to form a masked contents of the memory;
       2) a means for ANDing the contents of the register with the mask to form a masked contents of the register;
       3) a means for comparing the masked contents of the memory against the masked contents of the register; and
       4) a means for indicating that means (A) failed when the masked contents of the register are the same as the masked contents of the register.

11. The processor in claim 10 which further comprises:
    a register for providing the mask for use in means (1) and (2) of means (A).

12. The processor in claim 6 wherein:
    means (A) comprises:
       1) a means for comparing the contents of the specified location in the memory against a register; and
       2) a means for indicating that means (A) failed when the contents of the specified location in the memory is the same as the contents of the register.

* * * * *